(12) United States Patent
Morrison

(10) Patent No.: US 7,190,278 B2
(45) Date of Patent: Mar. 13, 2007

(54) ASSET TAG WITH EVENT DETECTION CAPABILITIES

(75) Inventor: Christopher S. Morrison, Scottsdale, AZ (US)

(73) Assignee: Nuvo Holdings, LLC, Scottsdale, AZ (US)

( * ) Notice: Subject to any disclaimer, the term of this patent is extended or adjusted under 35 U.S.C. 154(b) by 224 days.

(21) Appl. No.: 10/795,720

(22) Filed: Mar. 8, 2004

(65) Prior Publication Data
US 2005/0195081 A1 Sep. 8, 2005

(51) Int. Cl.
*G08B 21/00* (2006.01)

(52) U.S. Cl. .................. 340/689; 340/545.5; 340/571

(58) Field of Classification Search ............... 340/429, 340/440, 467, 669, 686.1, 689, 286.13; 200/61.45 R, 200/220; 73/718, 862.61, 514.18, 514.33
See application file for complete search history.

(56) References Cited

U.S. PATENT DOCUMENTS

| | | | |
|---|---|---|---|
| 3,170,597 A | 2/1965 | Reichenberger | |
| 3,733,447 A | 5/1973 | Schneider, Jr. | |
| 3,742,478 A | 6/1973 | Johnson | |
| 3,748,415 A | 7/1973 | Suzuki | |
| 3,845,883 A | 11/1974 | Johnson et al. | |
| 3,935,701 A | 2/1976 | Yamauchi et al. | |
| 4,135,067 A | 1/1979 | Bitko | |
| 4,168,410 A | 9/1979 | Norris | |
| 4,196,429 A * | 4/1980 | Davis ........................ 340/669 |
| 4,450,326 A | 5/1984 | Ledger ...................... 200/61.45 |
| 4,497,118 A * | 2/1985 | Byrum ...................... 33/366.21 |
| 4,547,972 A | 10/1985 | Heidel et al. | |
| 4,584,885 A * | 4/1986 | Cadwell .................. 73/862.61 |
| 4,591,676 A | 5/1986 | Jackman et al. | |
| 4,628,160 A | 12/1986 | Canevari | |
| 4,686,335 A | 8/1987 | Grant | |
| 4,751,353 A | 6/1988 | Stephens | |
| 4,833,281 A | 5/1989 | Maples ..................... 200/61.45 |
| 4,866,850 A | 9/1989 | Kelly et al. | |
| 4,884,067 A | 11/1989 | Nordholm et al. ........ 340/686.1 |
| 5,006,676 A | 4/1991 | Bogut et al. ............. 200/61.52 |
| 5,025,246 A | 6/1991 | Schenkel | |
| 5,136,127 A | 8/1992 | Blair ........................ 200/61.52 |
| 5,153,394 A | 10/1992 | Abendroth et al. ....... 200/61.52 |
| 5,252,795 A | 10/1993 | Su | |
| 5,255,819 A | 10/1993 | Peckels | |
| 5,285,033 A | 2/1994 | Ipcinski .................... 200/62.52 |

(Continued)

OTHER PUBLICATIONS

"Microchip: 14-Pin FLASH-based 8-bit CMOS Microcontroller" 2003 Microchip Technology Inc. Selected pp. 1-30.

*Primary Examiner*—Van T. Trieu

(57) ABSTRACT

Described herein are a transient event detector comprising electrical circuitry suitable to detect a transient event, and a container having a wall with at least two electrically conductive contacts that are electrically connected to the electrical circuitry, each of the at least two electrically conductive contacts being electrically isolated from each other, and a movable electrically conductive piece that intermittently connects at least two of the at least two electrically conductive contacts when the electrically conductive piece is in motion, said movable electrically conducting piece having a mass that is low enough such that if the movable electrically conducting piece is at rest and bridges two of the at least two electrically conductive contacts no transient event is detected by the electrical circuitry, methods of use and methods of manufacture.

20 Claims, 11 Drawing Sheets

U.S. PATENT DOCUMENTS

| | | | |
|---|---|---|---|
| 5,343,766 A * | 9/1994 | Lee | 73/862.61 |
| 5,406,256 A | 4/1995 | Ledel et al. | |
| 5,410,113 A | 4/1995 | Mielke | 200/61.45 |
| 5,457,293 A | 10/1995 | Breed | 200/61.52 |
| 5,460,710 A * | 10/1995 | Williams et al. | 205/780 |
| 5,507,182 A * | 4/1996 | Yamada et al. | 73/514.33 |
| 5,507,411 A | 4/1996 | Peckels | |
| 5,543,767 A | 8/1996 | Elenbaas | |
| 5,597,066 A | 1/1997 | Burmester | |
| 5,627,316 A | 5/1997 | De Winter et al. | |
| 5,639,999 A | 6/1997 | Hsu | 200/61.52 |
| 5,669,147 A | 9/1997 | Nakajima et al. | 33/334 |
| 5,808,254 A | 9/1998 | Wu | |
| 5,900,602 A | 5/1999 | Bitko | |
| 5,955,713 A | 9/1999 | Titus et al. | |
| 5,987,988 A | 11/1999 | Kunimi et al. | 73/514.01 |
| 6,005,205 A | 12/1999 | Chou | |
| 6,028,275 A | 2/2000 | Jou | |
| 6,036,055 A | 3/2000 | Mogadam et al. | |
| 6,172,357 B1 | 1/2001 | Sano et al. | 250/231.1 |
| 6,198,059 B1 | 3/2001 | Jou | |
| 6,323,446 B1 | 11/2001 | Schnell | |
| 6,339,199 B1 | 1/2002 | Chou et al. | |
| 6,341,428 B1 | 1/2002 | Tanazawa et al. | |
| 6,409,046 B1 | 6/2002 | Peckels | |
| 6,442,855 B2 | 9/2002 | Takeuchi et al. | |
| 6,504,481 B2 | 1/2003 | Teller | |
| 6,518,523 B1 | 2/2003 | Chou | |
| 6,559,396 B1 | 5/2003 | Chou | |
| 6,630,635 B1 | 10/2003 | Doepner | |
| 6,706,978 B2 | 3/2004 | Wagatsuma et al. | |
| 6,800,841 B1 | 10/2004 | Chou | |
| 2003/0055589 A1 | 3/2003 | Mogadam | |
| 2003/0110652 A1 | 6/2003 | Greway | |
| 2004/0084290 A1 | 5/2004 | Higgins et al. | |

* cited by examiner

Fig. 5

Top Tag Physical Block Diagram (Preferred Embodiment)

Enclosure
Structurally Formed from the Bottom, Middle and Top Printed Circuit Boards (PCB's) epoxied together. Additionally, for aesthetic And environmental protection each side is covered by the Bottom and Top Polyester Overlays attached with acrylic adhesive. Optionally, for purely aesthetic reasons, there can be paint around the edge or a plastic edge piece.
The space for the Tag Electrical Components and battery is created by a 20mm routed hole in the 4.1mm thick Middle PCB. The Entire enclosure also incorporates a 0.750 inch hole that a standard liquor pour spit is snapped into. (In normal use the Combined Tag/Spout is then inserted into the mouth of a typical liquor bottle therefore "attaching" the Bottle Tag to the Container.)

Push Button
With the Preferred Embodiment
This is created by a conductive
Backed dome in the Bottom
Polyester Overlay and a contact
That is part of the bottom side of
The Bottom PCB.
(Connected to an input pin of the
Microcontroller Portion.)

Crystal
(Connected to Transmitter
Portion.)

Battery
Preferred Embodiment used 2032 lithium coin cell

Microprocessor/Transmitter
The Preferred Embodiment uses a Microchip rfPic509 that Has the Microcontroller and Transmitter Portion physical Integrated into the same integrated Circuit Package. The rfPIC12C509 Microcontroller Portion has a built in Periodic Wakeup Mechanism, 1k instructions of Non-Violate "code" memory, 41 bytes of Violate "ram" memory. And RC oscillator. The Transmitter Portion has an Integrated Real Time Reference.

Loop Antenna
Around periphery of Tag.
(Connected to Transmitter Portion)

Loop Antenna Tuning Capacitor
Has a hole in center to adjust during manufacturing

Tilt Event Sensor
The Preferred Embodiment has four Dynamic Tilt Sensors in parallel each Composed of a 93mil diameter cylindrical cavity in the Middle PCB with conductive Walls and specially shaped "Un-tilt" and "Tilt" contacts on the inward-facing surface of the Bottom and Top PCB's, and a conductive 59mil moveable element (ball bearing) "trapped" in the cavity. (Each side of the Tilt Sensor is Connected to an I/O pin of Microcontroller Portion.)

Tilt / Un-tilt

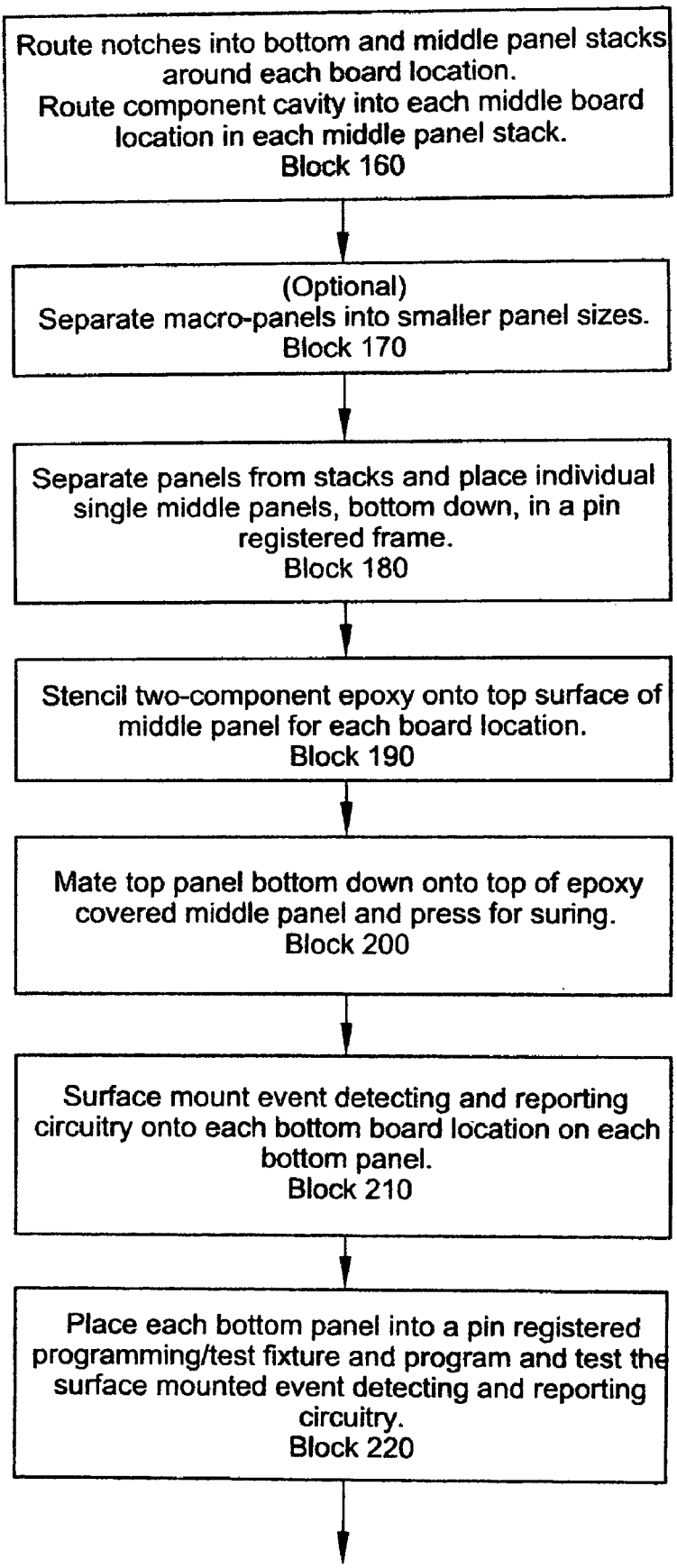

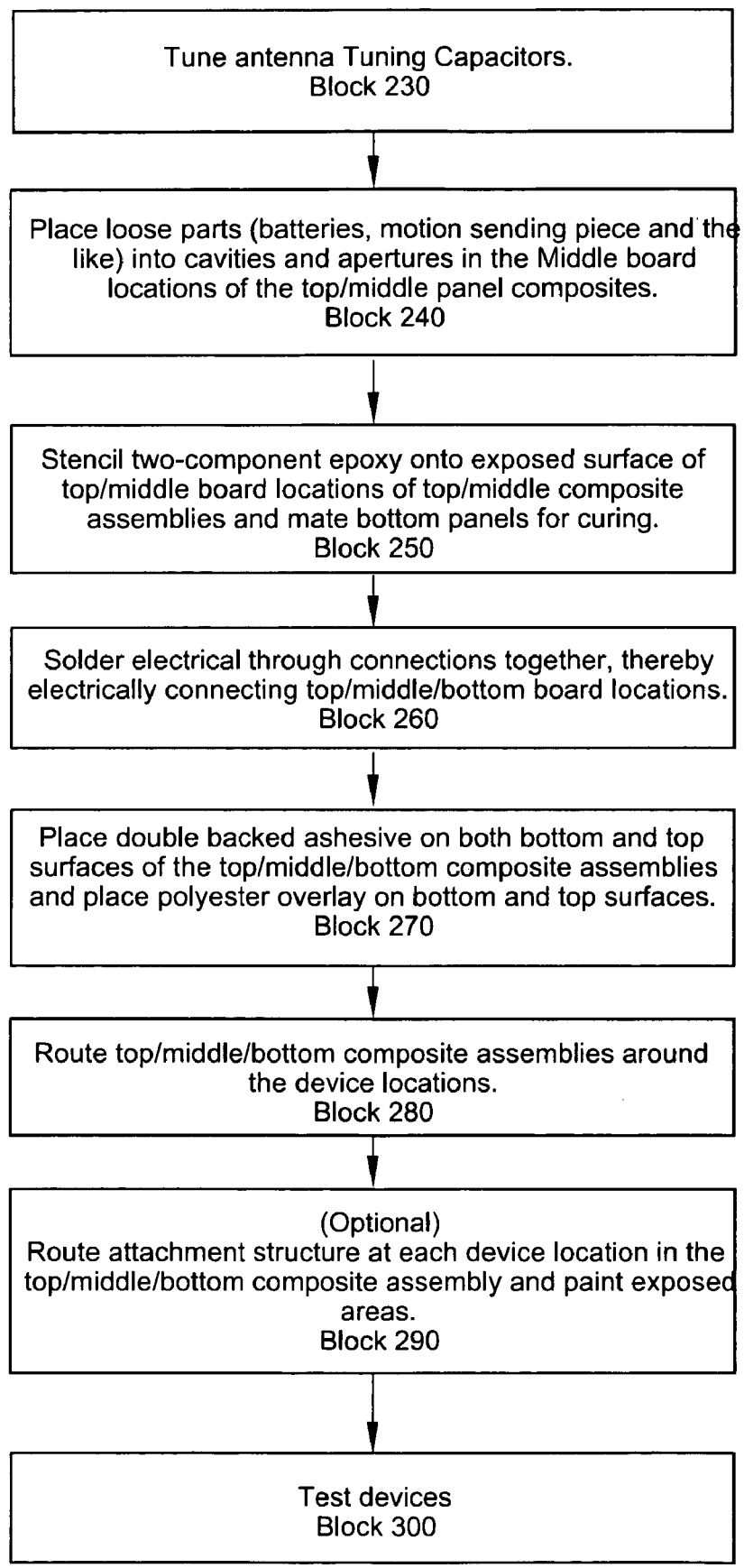

ASSET TAG WITH EVENT DETECTION CAPABILITIES

FIELD OF THE INVENTION

The present invention relates generally to asset tags with event detection capabilities. More specifically, the present invention relates to asset tags with event detection capabilities wherein the events are tilt, motion, acceleration, temperature, breakage, button presses, or the like.

BACKGROUND

The identification, measurement and/or control of physical assets are important aspects of modem business practices. Frequently, assets are misidentified, misplaced or incorrectly dispensed, thereby leading to incorrect inventory and/or receivables.

A common modem method for dealing with asset control is the use of bar codes. These bar codes can be used to both identify a product and support the determination of the time and location of dispensation.

Another increasingly common method for asset control is the use of radio frequency tags (RF tags). These are tags that are attached to inventory and that include at least a radio transmitter and identification circuit. The identification circuit continually, periodically, or after an interrogatory is sent from a receiver sends the identification of the product.

These systems, while excellent for product identification, are not optimized for tracking events that may occur to the products. These events may be movement of the asset, tilting of the asset, acceleration of the asset, changes in temperature of the asset, breakage of the asset (or associated tag), button presses, and the like.

Therefore, there is a present and continuing need for improved asset tags used for the identification, measurement and/or control of physical assets.

SUMMARY OF INVENTION

It is an object of the present invention to provide a transient event detector comprising at least one detecting area located on or in at least one wall of the container and at least one movable piece contained within the container, wherein at least one of the at least one detecting areas changes state when the movable piece enters or leaves a predetermined distance from the detecting area and an electronic circuit that is suitable to detect a transient change of state of the at least one detecting area.

It is another object of the present invention to provide a transient event detector, as above, that comprises at least one movable piece contained within a container.

It is a yet another object of the present invention to provide a transient event detector, as above, comprising at least two movable pieces.

It is still yet another object of the present invention to provide a transient event detector, as above, that has at least one event detecting area that can interact with at least one movable pieces.

It is a further object of the present invention to provide a transient event detector, as above, that comprises at least two event detection areas, at least one of the at least two event detection areas is on or in one of the at least one wall and at least one of the at least two event detection areas is on or in another of the at least two walls.

It is a yet a further object of the present invention to provide a transient event detector, as above, comprising at least two walls, at least two event detecting areas, at least one of the at least two event detection areas is on or in one of the at least one wall and at least one of the at least two event detection areas is on or in another of the at least two walls, at least one of the at least two event detecting areas being different from at least one of the remaining event detecting areas and able to detect electrical change events, magnetic change events, chemical change events, physical change events or structural change events, and wherein there are at least two movable pieces and at least one of the at least two movable pieces is electronically, magnetically, chemically, physically or structurally different from at least one of the remaining movable pieces.

It is still yet a further object of the present invention to provide a transient event detector comprising electrical circuitry suitable to detect a transient event, and a container having a wall with at least two electrically conductive contacts that are electrically connected to the electrical circuitry, each of the at least two electrically conductive contacts being electrically isolated from each other, and a movable electrically conductive piece that intermittently connects at least two of the at least two electrically conductive contacts when the electrically conductive piece is in motion, said movable electrically conducting piece having a mass that is low enough such that if the movable electrically conducting piece is at rest and bridges two of the at least two electrically conductive contacts no transient event is detected by the electrical circuitry.

It is an additional object of the present invention to provide a transient event detector, as above, comprising at least first, second and third electrically conductive contacts and the container is configured such that there is at least one movement barrier that prevents the movable electrically conducting piece from freely moving between a position that bridges first and second conductive contacts and a position that bridges first and third conductive contacts.

It is yet an additional object of the present invention to provide a transient event detector, as above, wherein the movement barrier is the container's configuration.

It is yet an additional object of the present invention to provide a transient event detector, as above, wherein the first electrically conductive contact is located between the second and third electrically conductive contacts and the second and third electrically conductive contacts are located at opposite ends of the container.

It is still yet an additional object of the present invention to provide a transient event detector, as above, wherein the second and third electrically conductive contacts are parallel to each other and substantially perpendicular to the first electrically conductive contact.

It is another object of the present invention to provide a transient event detector, as above, wherein the second and third electrically conductive contacts are parallel to each other and the first conductive contact is angled relative to at least one of the second or third electrically conductive contacts.

It is yet another object of the present invention to provide a transient event detector, as above, wherein the first conductive contact is angled relative to the second and third electrically conductive contacts.

It is still yet another object of the present invention to provide a transient event detector, as above, wherein the first and second electrically conductive contacts are on the same surface, the third electrically conductive contact is perpendicular to both the first and second electrically conductive contacts, and the first electrically conductive contact is located between the second and third electrically conductive contacts and is raised relative to the second electrically conductive contact.

It is another object of the present invention to provide an improved tilt sensor.

It is yet another object of the present invention to provide an improved event detector.

It is a further object of the present invention to provide an asset tag that can detect the tilt each time a bottle is poured and the elapsed time of the pour.

It is still a further object of the present invention to provide an asset tag with a user interface for communicating information about an asset.

It is still yet another object of the present invention to provide an asset tag that can communicate information in a reliable, accurate, and timely manner with minimum user hassle, overhead, and expense.

It is another object of the present invention to provide an asset tag that is easy and cost effective to manufacture.

It is a further object of the present invention to provide an asset tag that is durable and can survive impacts and exposure to water, alcohol, heat, and cold.

It is an additional object of the present invention to provide an asset tag with a long battery life.

It is yet another object of the present invention to provide an asset tag that will not significantly affect the ambiance of an establishment.

The novel features that are considered characteristic of the invention are set forth with particularity in the appended claims. The invention itself, however, both as to its structure and its operation together with the additional object and advantages thereof will best be understood from the following description of the preferred embodiment of the present invention. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

FIG. 5 is a simplified hardware diagram of the electrical components for the circuit of the present invention.

DETAILED DESCRIPTION OF PREFERRED EMBODIMENTS

The present invention is a device 10 that is useful for measuring events that occur to assets. More specifically the device is useful for measuring events such as motion, tipping, acceleration, temperature changes, breakage, button presses or the like using a transient event detector.

Figure 1:
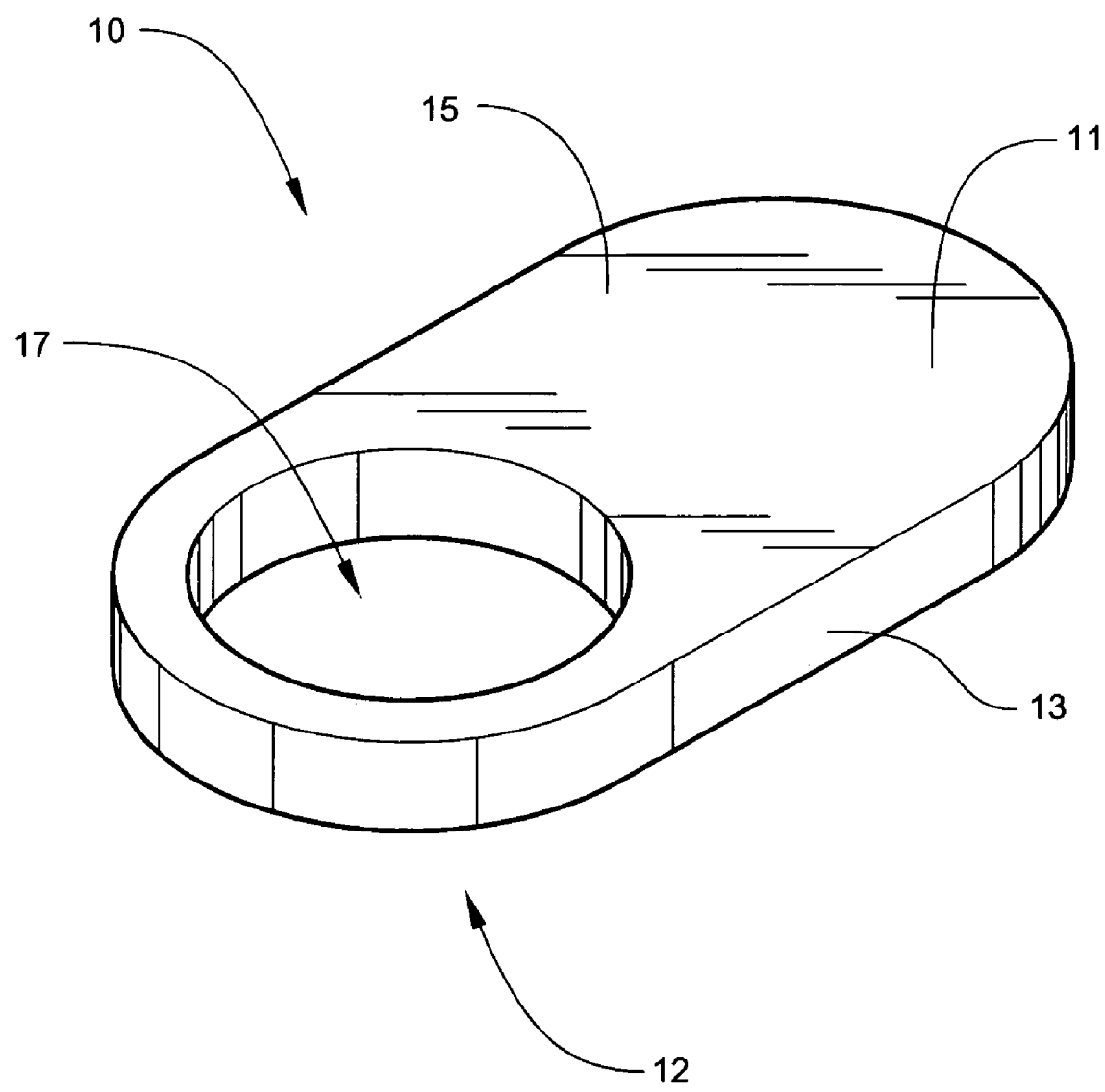
FIG. 1 is a perspective view of a device according to the present invention.

With reference to the Figures, and initially FIG. 1, the present invention is an asset tag device 10 that is removably or permanently associatable with an asset. This device 10 functions to track physical properties of the associated asset such as location, motion, tilting, changes in temperature, breakage, or the like.

The device 10 according to the present invention primarily comprises a body 15 that contains at the least one event detection and reporting circuitry 50 that further comprises at least one event detection structure 35 and an electromagnetic transmitter, such as a radio transmitter. In one preferred embodiment, the device 10, according to the present invention, further includes at least one attachment structure 17. In the most preferred embodiment, the attachment structure is an aperture or opening in the body 15 that is suitably sized to receive a projecting or elongate portion of the asset, such as a neck of a bottle or the like. Other structures that are capable of being received by the aperture 17, such as a suitably sized spheres and the like, are considered to fall within the scope of the present invention. Additionally, other attachment structures, both chemical or mechanical, that function to associate the body 15 to an asset may be used and are also considered to fall within the scope of the present invention.

In the preferred embodiment, the body 15 specifically comprises a top section 11, a bottom section 12, and an intermediate section 13 that is sandwiched between the top and bottom sections, 11 and 12, and contains at least one cavity 14 that further contains the event detecting and reporting circuitry 50. Preferably, the event detecting and reporting circuitry 50 is securely either built directly into the cavity 14 or built separately and then attached to an interior surface of the cavity 14 to prevent unwanted movement or breakage of the circuitry 50.

Figure 2A:
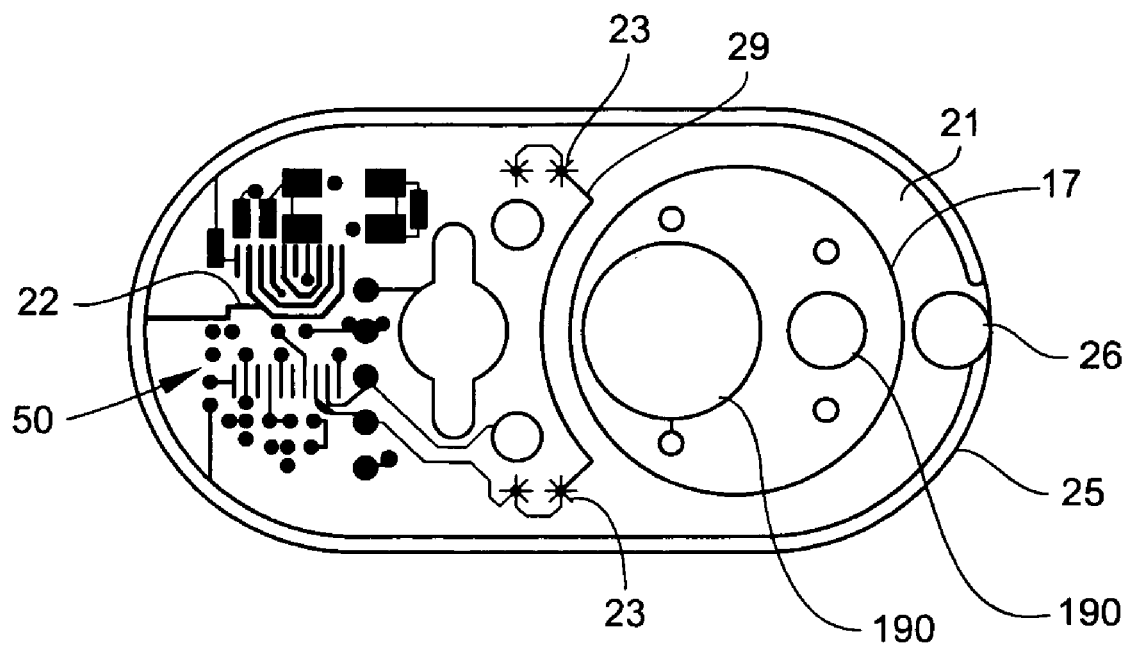
FIG. 2a is a top view of the bottom board according to the present invention illustrating a preferred electrical circuit trace for the top side of the bottom board.
Figure 2B:
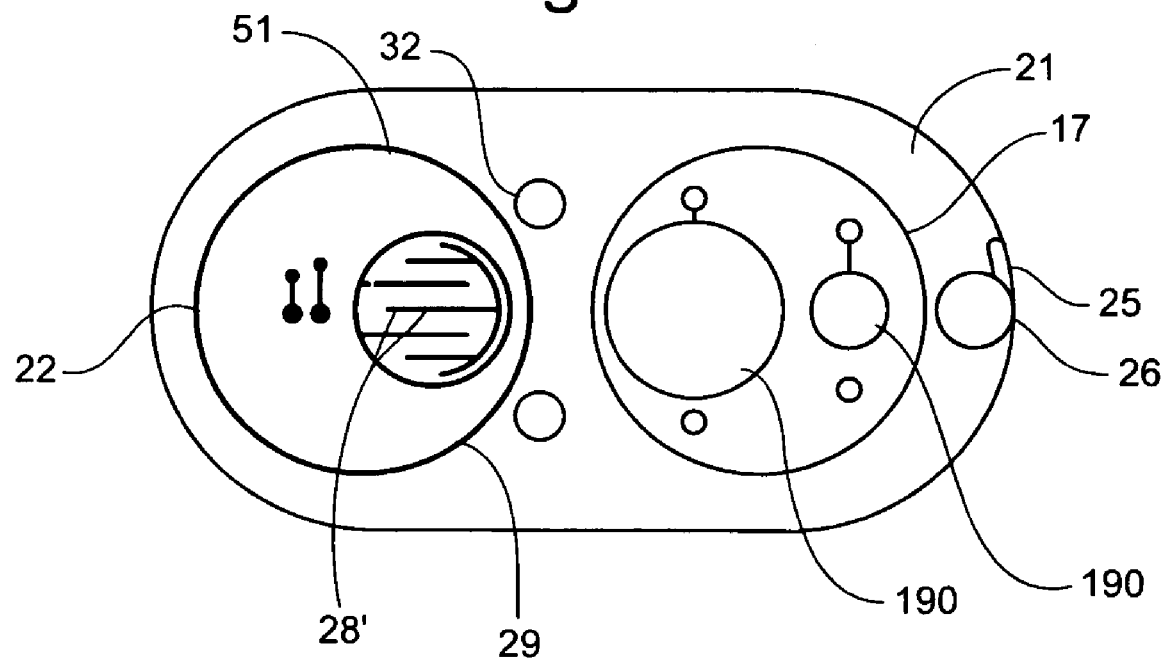
FIG. 2b is a bottom view of the bottom board according to the present invention illustrating a preferred circuit trace for the bottom side of the bottom board.
Figure 3A:
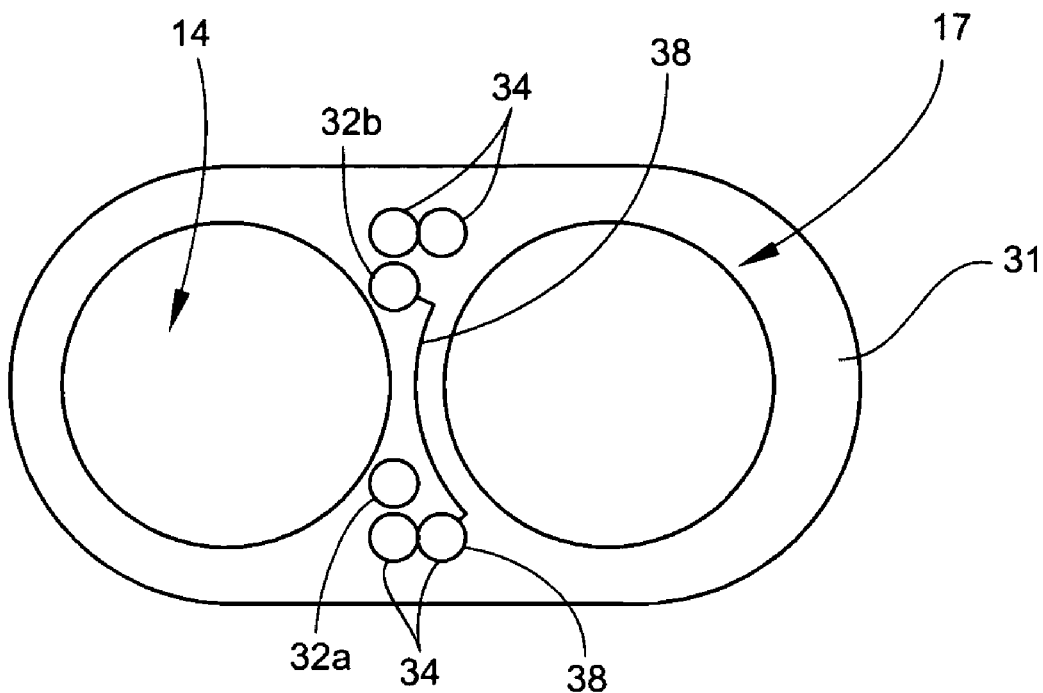
FIG. 3a is a top view of the middle board according to the present invention illustrating a preferred electrical circuit trace for the top side of the middle board.
Figure 3B:
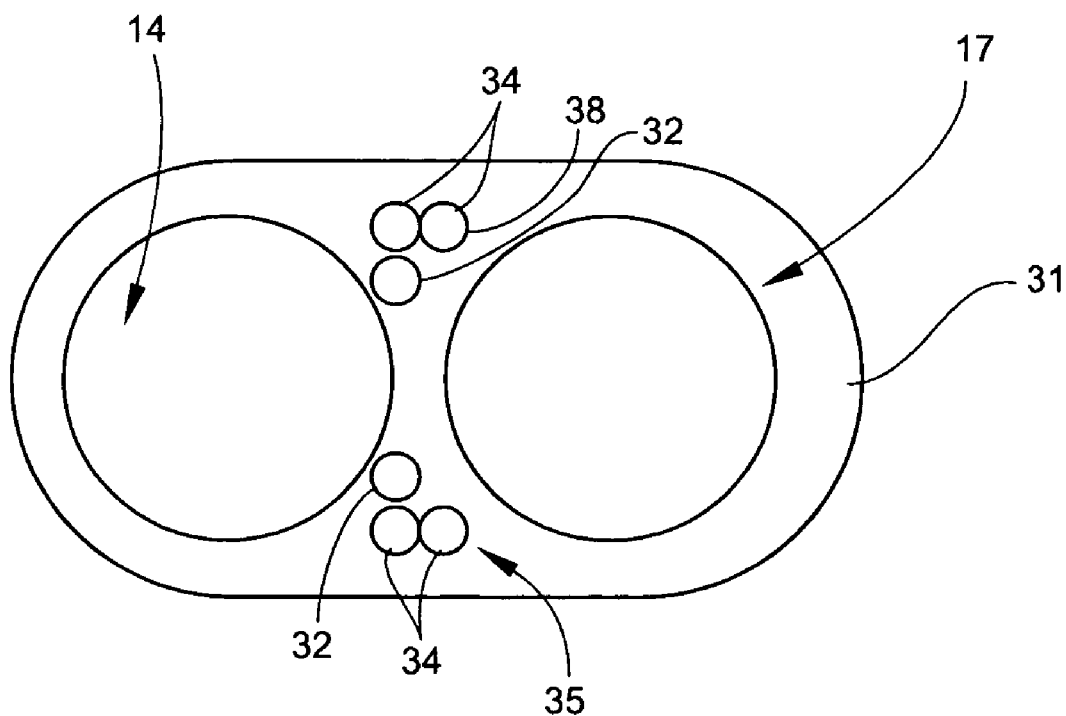
FIG. 3b is a bottom view of the middle board according to the present invention illustrating a preferred electrical circuit trace for the bottom side of the middle board.
Figure 4A:
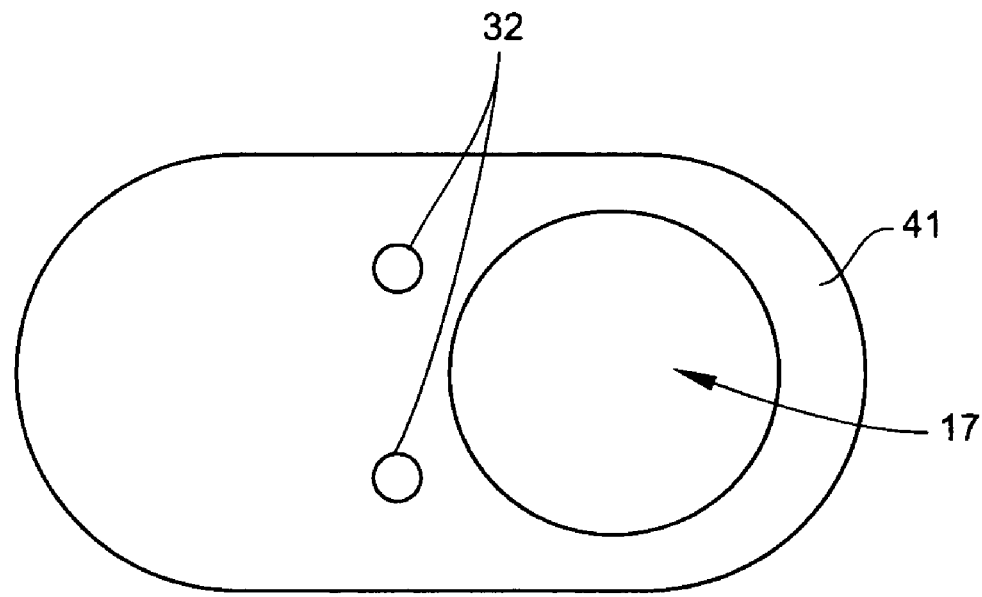
FIG. 4a is a top view of the top board according to the present invention illustrating a preferred circuit trace for the top side of the top board.
Figure 4B:
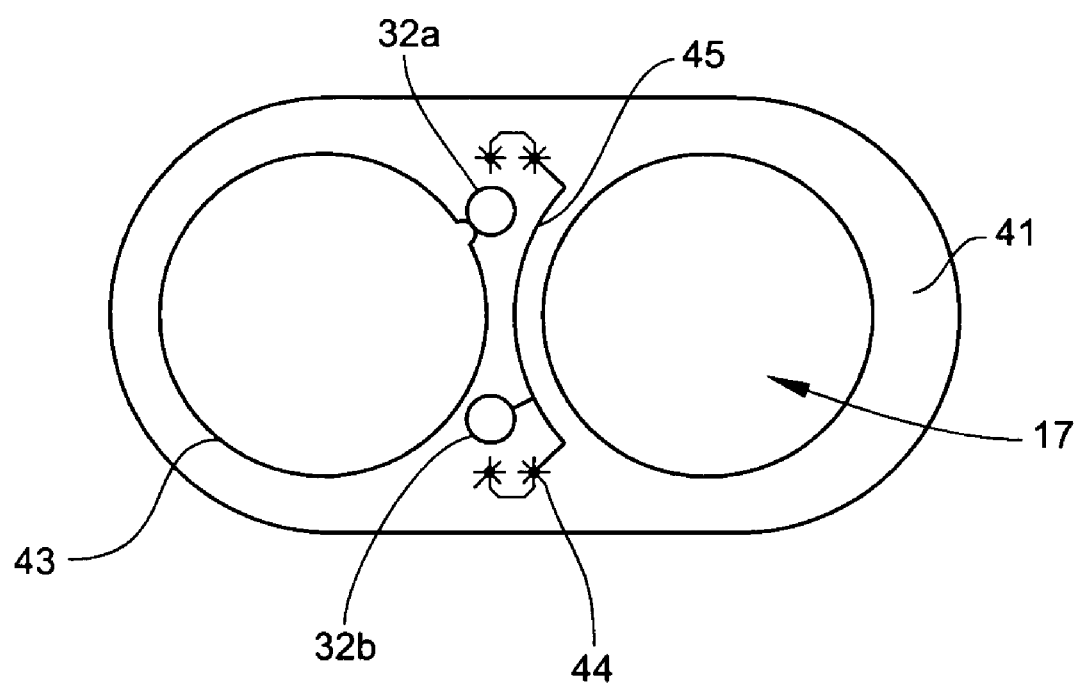
FIG. 4b is a bottom view of the top board according to the present invention illustrating a preferred circuit trace for the bottom side of the top board.

In a more preferred embodiment, the top section 11 is a top circuit board 41, FIGS. 4a and 4b, the bottom section 12 is a bottom circuit board 21, FIGS. 2a and 2b, and the intermediate section 13 is a middle circuit board 31, FIGS. 3a and 3b, which are assembled to form a composite body 15. These circuit boards, 21, 31, and 41 are preferably printed circuit boards, which, together, form a complete circuit, outlined in FIG. 5. Materials other than printed circuit boards may be used for the top, bottom and intermediate sections, 11, 12 and 13, and circuit boards other than printed circuit boards may be used for these sections, and still fall within the scope of the present invention.

In order for two or more, and preferably all three boards, 21, 31 and 41, to form a complete electrical circuit, each board includes one or more electrical through connections, referred to generally as 32.

The bottom circuit board 21 includes a plurality of small apertures 28 used for electrically connecting the event detection and reporting circuitry 50 to a circuit printed on one or both sides of the bottom board 21. In this preferred embodiment, elements of the event detection and reporting circuitry 50 are surface mounted to a top surface of the bottom board 21 (thereby defining which board is considered the bottom board). As can be seen from FIGS. 2a and 2b, the preferred embodiment include circuit traces on both top and bottom surface of the bottom board 21. The surface mounting of elements of the event detection and reporting circuitry 50 is accomplished using any of a number of readily available methods well known to one of ordinary skill in the arts.

The middle circuit board 31 includes an aperture or channel that forms the cavity 14 that will ultimately contain the event detection and reporting circuitry 50. The middle circuit board 31 further contains at least one event detection structure 35, which in this embodiment comprises at least one aperture 34 that will contain a movable piece 36 for each aperture 34. The at least one event detection structure 35 and/or aperture 34 is electrically connected to the top and bottom circuit boards, 41 and 21, through the apertures 32 that electrically extend through the middle board 31. As can be seen from FIGS. 3a and 3b, the preferred embodiment include circuit traces on both top and bottom surface of the middle board 21.

Referring to FIGS. 4a and 4b, the preferred circuit trace on the top surface of the top board 41 comprises a battery ground contact 43 electrically connected to a first of the at least two through holes 32a for electrically connecting the top, middle, and bottom boards, 41, 31 and 21. The preferred circuit trace on the bottom surface of the top board 41 has at least one first printed contact configuration 44 that is electrically connected 45 to any additional printed contact configurations 44 and further electrically connected to a second of the at least two through holes 32b for electrical connection to the middle and bottom boards, 31 and 21.

Referring to FIGS. 2a and 2b, the preferred circuit trace on the top surface of the bottom board 21 comprises a circuit trace 22 that electrically connects the various elements of the event detection and reporting circuitry 50. The exact configuration depends upon the exact circuitry used. However, in a preferred embodiment of the present invention, the printed circuit found on the top surface further comprises at least one second contact configuration 23 that is electrically connected 24 to the circuit trace 22. Also, there is a loop antenna 25 that is tuned by an antenna tuning capacitor 26 electrically connected to the circuit trace 22 that forms a part of a preferred radio transmitter for event detection information transmission. These electrical connections to the circuit trace 22 allow the second contact configuration 23 and loop antenna 25 and antenna tuning capacitor 26 to be utilized by the event detecting and reporting circuitry 50.

In the preferred embodiment, a switch, such as a button type single pole switch is included by electrically attaching the switch to the event detecting and reporting circuitry 50 by electrical leads that extend through at least two of the through the holes 28 located in the bottom board 21. Preferably, however, a second circuit 51 is created on a bottom surface of the bottom board 21. This second circuit 51 is in electrical contact with the circuit trace 22 through some of the small apertures 28. Additionally, there may be a ground plane 29, and preferably the second circuit 51 and the ground plane 29 form an independent switch circuit, whereby the temporary electrical shorting of the independent switch circuit (ground plane 29 to the second circuit 51), such as using an electrically conductive polymer concave button, would constitute a measurable transient event.

As can be seen from FIG. 5, the electrical circuit is preferably powered by a battery, most preferably a lithium coin cell. The batter is electrically connected to a microprocessor/transmitter that preferably has the microcontroller and transmitter physically integrated and a built in periodic wakeup mechanism, 1024 instructions of non-violate "code" memory, 41 bytes of violate "ram" memory, an RC oscillator and an integrated Real Time Reference. Electrically connected to the transmitter portion is a loop antenna with an antenna tuning capacitor. Also connected to the microcontroller are a crystal and, optionally, a push button that is electrically connected to an input pin of the microcontroller. Finally, there are at least one event detectors that are electronically connected to an input pin of the microcontroller.

The at least one event detection structure 35 according to the present invention may detect any of a number of individual or multiple events. In the preferred embodiment, the event detection structure 35 is a motion/tilt sensor that is comprised of the above discussed aperture 34 in the middle board 31, and the first and second contact configurations 44 and 23 printed on the top and bottom circuit boards 41 and 21. These form a container for a movable, electrically conducting piece 36 such as a metal bearing or the like. The aperture 34 may assume any number of alternate shapes, such as a square hole, a rectangular hole, an octagonal hole, or the like, and still fall within the scope of the present invention so long as it is capable of forming a container for the movable, electrically conducting piece 36. In an alternate embodiment, the aperture 34 may be beveled, yielding a shape like a frustum. In this embodiment, the event detection structure 35, which is a tilt detector, is able to detect different tilt angles, depending upon the angle of the bevel. The container may be of any suitable shape sufficient to contain the movable piece, but is not limited to a singe chamber, lobe or other size/waist variation. While a single event detection structure 35 is sufficient for event detection, the preferred embodiment utilizes four for statistical accuracy and cost efficiency.

The configuration of the first and second contact configurations 44 and 23 have at least one edge, preferably two, that are electrically contactable with the electrically conducting piece 36 at any given rest position. Further, this at least one edge is positioned and sized such that the electrically conducting piece 36 is capable of making electrical contact between the at least one edge and conductive plating 38 on the inside surface of the aperture 34.

The first and second contact configurations, 44 and 23, are preferably star type configurations comprising a central node with at least two, preferably eight radially extending arms. In the preferred embodiment, the first contact configuration 44 is rotated by 22.5 degrees relative to the second contact configuration 23 (in order to maximize movement perturbation of the electrically conducting piece 36). Other configurations, symmetrical, non-symmetrical, matching and/or non-matching, may be used for the first and second contact configurations 44 and 23 and still fall within the scope of the present invention.

Other event detection structures 35 may be used and still fall within the scope of the present invention. In an alternate embodiment the event detection structure 35 is a motion sensor, such as can be formed by changing the contact configurations to merely measure a simple change in state. In another alternate embodiment, the event detection structure 35 is a temperature sensor, such as can be accomplished by using a thermistor or changes in a crystal oscillator or the like.

In use, the asset tag device 10, according to the present invention, is associated with an asset. This association may be either permanent, such as by adhesive or the like, or removable, such as placement, attachment by hook and loop fasteners, or the like. When a transient event, such as motion, tilting, acceleration, temperature change, breakage, button press or the like occurs, the tag 10 detects the transient event and reports the transient event to a remote receiver through the event detection and reporting circuitry 50.

In the preferred embodiment of the event detection structure 35, the motion/tilt detector, the transient event is a change of state that is detected when electrical continuity between the conductive plating 38 and the first contact configuration 44 is removed and replaced by electrical continuity between the metallic plating 38 and the second contact configuration 23 (or vice-versa), such as occurs when the tag is moved or tilted.

In the most preferred embodiment, the electrically conductive piece 36 is light enough such that when it is at rest and in contact with the conductive plating 38 and either the first or second contact configurations 44 or 23, there is effectively no measurable conduction. Conduction only occurs when the conductive piece 36 is moved across the aperture 34 and stopped by the other side (the sudden reversal of the travel direction of the conductive piece 36 allows current to flow from the conductive plating 38 through the conductive piece 36 and to the contact configurations, 44 or 23). This allows the detector to be made much smaller that previously possible and lowers manufacturing costs.

Generally, the event detection structure 35 is a dynamic event detector, which is a multi-piece detector that detects a change in state caused by the movement of one of the pieces. In its most general form, the dynamic event detector is a container that has at least one event detection areas within the container. The container holds at least one movable piece. An event is detected when at least one of the movable pieces moves to within a predetermined distance from at least one of the event detection areas. Critically, there needs to be electrical circuitry sufficient to detect a dynamic event. The circuitry must be sophisticated enough to discriminate the difference between the state of the movable piece at rest and bridging two contacts and the movable piece in motion and bridging two contacts, regardless of whether a rest state is measured or not. A dynamic or transient event includes, but is not limited to, a change in resistance caused by the contact of a movable piece on or near a suitable detection area, a current caused by the movement of a movable piece across a detection area, a current caused by the contact of a movable piece between two detection areas, a magnetic spin change caused by a magnetic movable piece moving near or across a detection area, a temporary change in crystal structure caused by impact of a movable piece on a detection area, a temporary change in chemical configuration, such as a cis-trans shift, caused by a movable piece, or the like.

Additionally, there may be multiple different event detectors, such as an electrical event detector and a magnetic event detector, which may utilize either the same movable piece or different movable pieces.

As a specific example, the following description of the operation of the present invention relates to use of the present invention in an environment where alcoholic beverages are sold and consumed. This description is not to be taken in a limiting sense but is made merely for the purpose of describing the general operating principles of the invention. Asset tag devices 10 are physically attached to assets, such as bottles of wine or to bottles of distilled spirits, typically using an aperture type attachment structure 17. The asset tag devices 10 are then able to detect and report transient events that occur to the bottles, such as movement, tipping, temperature changes or the like. Such asset tags may be used in systems including, but not limited to the one disclosed in co-pending U.S. application Ser. No. 60/551,191, filed simultaneously herewith, the disclosure of which is incorporated herein by reference.

Figure 6:
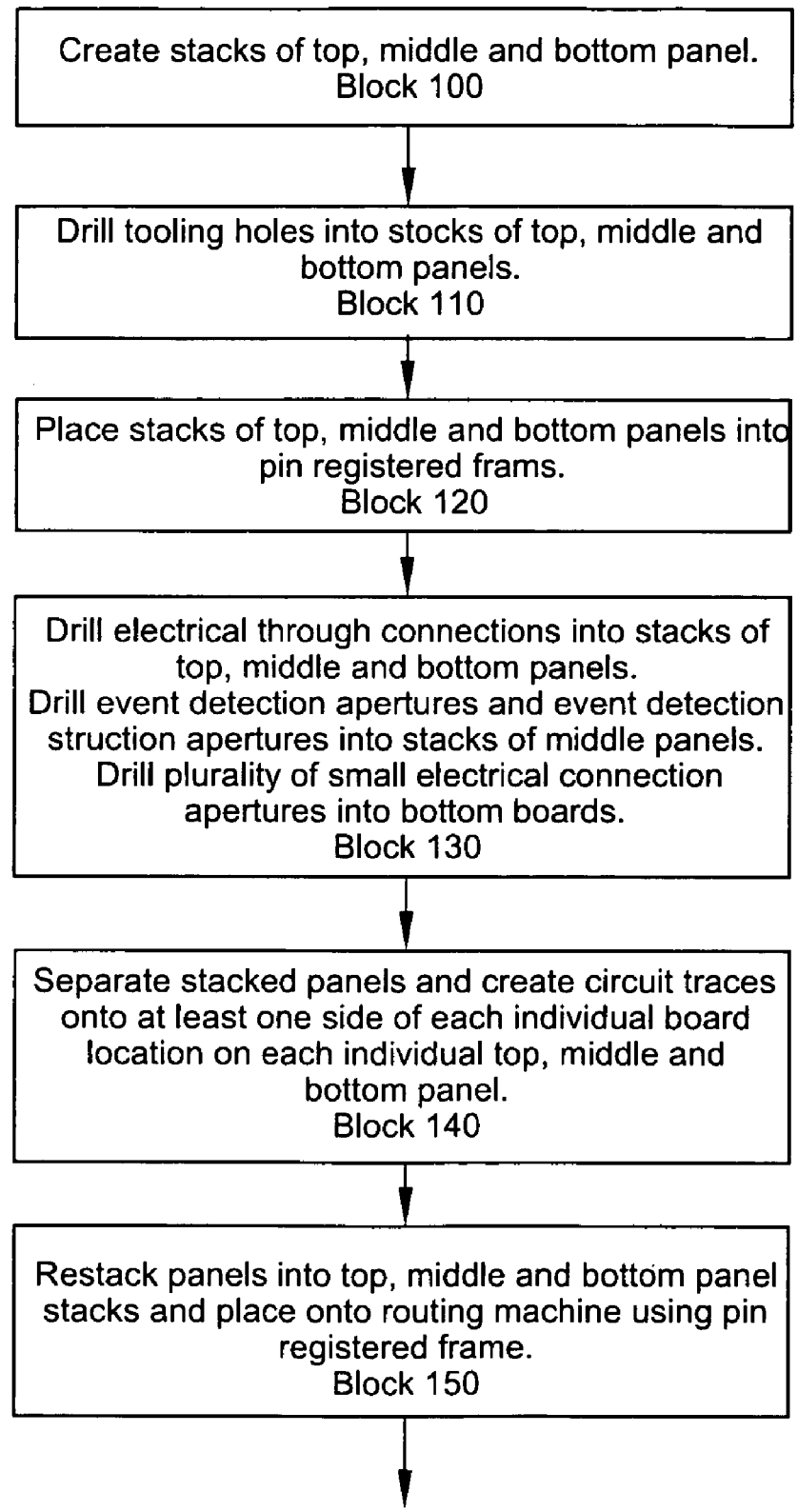
FIG. 6 is a flowchart describing the preferred manufacturing method according to the present invention.
Figure 6A:
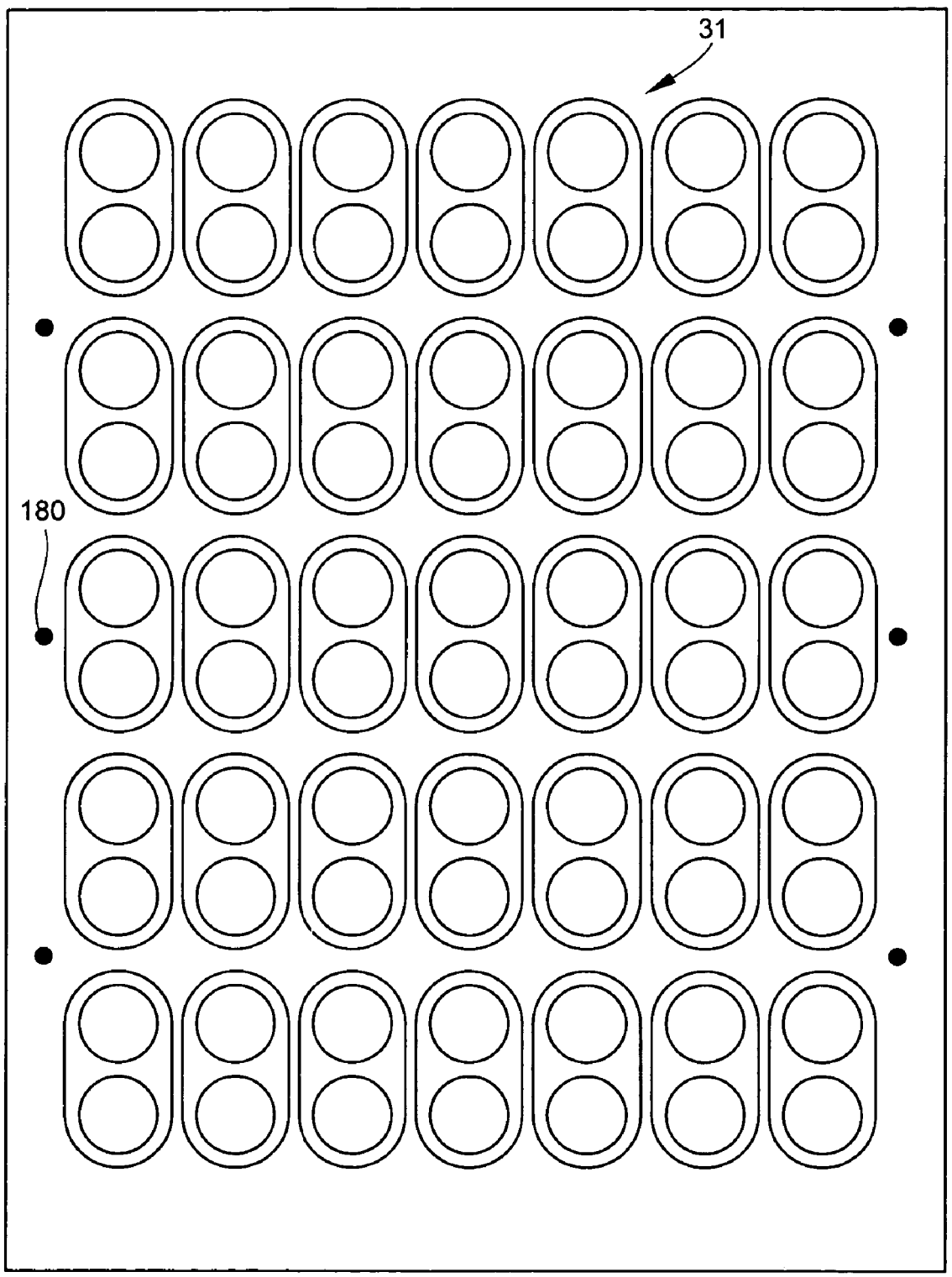
FIG. 6a is an example of an array of board locations in a panel, specifically a middle panel.

The preferred method for manufacturing the device 10, according to the present invention, see FIG. 6, begins with three distinct panels, top panels, bottom panels and middle panels, 141, 121, and 131, respectively. These three distinct panels comprise arrays of top, bottom, and middle boards, 41, 21, and 31, which are the preferred forms of the top, bottom and intermediate sections, 11, 12, and 13 discussed above. Preferably, top panels 141 correspond to and are used to manufacture multiple top boards, 41, middle panels 131 correspond to and are used to manufacture multiple middle boards, 31, and bottom panels 121 correspond to and are used to manufacture multiple bottom boards, 21.

Preferably, the bottom panels 121 are 30 mil 12×9 inch panels of 0.5 oz FR4 (Fire Retardant Type 4) or other materials that are commonly used as circuit boards in the industry. Preferably, the middle panels 131 are 160 mil 12×9 inch panels of 0.5 oz FR4 or other materials that are commonly used as circuit boards in the industry. Preferably, the top panels 141 are 30 mil 12×9 inch panels of 0.5 oz FR4 or other materials that are commonly used as circuit boards in the industry. Preferably, multiple individual panels are manipulated simultaneously in stacks, and multiple stacks of panels are also manipulated simultaneously. However, individual panels or individual stacks of panels may be manipulated separately and at different times from other panels or stacks and still fall within the scope of the present invention.

The top, middle, and bottom panels, 141, 131, and 121, are stacked and then drilled for tooling holes 180. Blocks 100 and 110, FIG. 6. The stacks of panels are then placed onto pin registered frames for further processing. Block 120, FIG. 6.

In the stack of top panels, at least two electrical through connections 32 are drilled into each top board location for electrical connection between the top, middle and bottom circuit board locations, 41, 31, and 21. In the stack of middle panels, the at least two electrical through connections 32 are drilled into each middle board location for electrical connection between the top, middle and bottom circuit boards. There are also at least one, preferably four apertures 34 drilled, one for each event detection structure 35. In the stack of bottom panels, two electrical through connections 32 are drilled into each bottom board location for electrical connection between the top, middle and bottom circuit boards and a plurality of small apertures 28 for electrical connection to event detection and reporting circuitry 50 in each bottom board location. Block 130, FIG. 6.

The stacks of panels are separated into individual panels and circuit traces, whether located on one or both sides of the boards, are created onto individual board locations using techniques common in the circuit board industry. These circuit traces include at least conductive plating of the electrical through connections 32 and event detection structure apertures 34 and are created onto each top, middle, and bottom board location of top, middle, and bottom panels 141, 131, and 121. Block 140, FIG. 6. The separated and circuited panels are reassembled into stacks and placed onto a routing machine using a pin registered frame. Block 150, FIG. 6.

At least one, preferably four, notches are routed into bottom and middle panel stacks around each individual bottom and middle board location, respectively. The notches in the bottom panel stacks should match and register with the notches in the middle panel stacks. Additionally, a component cavity 14 is routed into each middle board location in each middle panel stack. Block 160, FIG. 6. Alternatively, this notching step could be performed on the top and middle panels.

If the above steps are performed on macro-panels (panels larger than 12×9 and typically sized to accommodate four 12×9 panels), the stacked macro-panels are cut or otherwise separated into 12×9 panel stacks. Block 170, FIG. 6.

Next, the top and middle panels, 141 and 131, are re-separated from their stacks and an individual middle panel 131 is placed bottom down in a pin registered frame and an adhesive, preferably two-component epoxy, is stenciled onto the top surface of the middle panel 141 on each middle board location. Block 180 and 190, FIG. 6. A top panel 141 is mated on top of the middle panel using the pin registered frame to form a top/middle composite assembly. Block 200, FIG. 6. Multiple top/middle composite assemblies may be stacked and pressed for epoxy curing. After curing, the individual composite assemblies are reseparated from the stacks for further processing.

Separately, whether before, simultaneously or after the top/middle composite assemblies are formed, the event detecting and reporting circuitry 50 is surface mounted onto each individual bottom board location 21 of separated bottom panels 121. This process is accomplished using methods that are common to the industry. Block 210, FIG. 6.

The bottom panels 121 are then placed into a pin registered programming/test fixture to program and test the surface mounted event detecting and reporting circuitry 50. Circuits 50 with bad tests are noted for exclusion from use as ultimate product. Block 220, FIG. 6.

At least one, preferably two, test capacitors 190 located on each of the bottom panels 121, preferably located at each of the four corners of the bottom panels 121, are measured to determine proper antenna tuning capacitor target size adjustments for the antenna tuning capacitors 26. After the antenna tuning capacitor target size adjustments are determined, the capacitance of each of the antenna tuning capacitors 26 is adjusted by drilling a hole in each of the antenna tuning capacitors with a size that brings the antenna tuning capacitors generally equal to the target size, thereby creating an antenna tuning capacitor 26 that tunes the antenna 55 to the specific frequencies used by the devices 10 according to the present invention. The bottom panels 121 may be stacked during this step, especially when the adjustment drill size of each of the individual panels is the same. In a preferred embodiment of this tuning method, there are at least two differently sized tuning capacitors 190 that are measured and used to calculate the target size adjustments. In an even more preferred embodiment, there are four pairs of two differently sized test capacitors 190, one pair located adjacent to each corner of the bottom panel 121 (thus allowing for compensation for dielectric, thickness and other manufacturing variations across the board). Block 230, FIG. 6.

Figure 7:
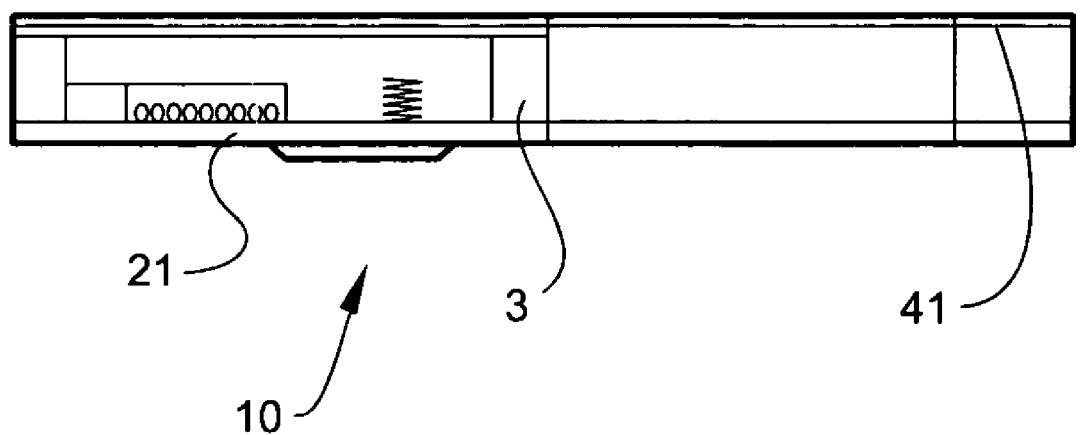
FIG. 7 is a cut-away view of the device according to the present invention illustrating battery and spring contact placements.
Figure 8:
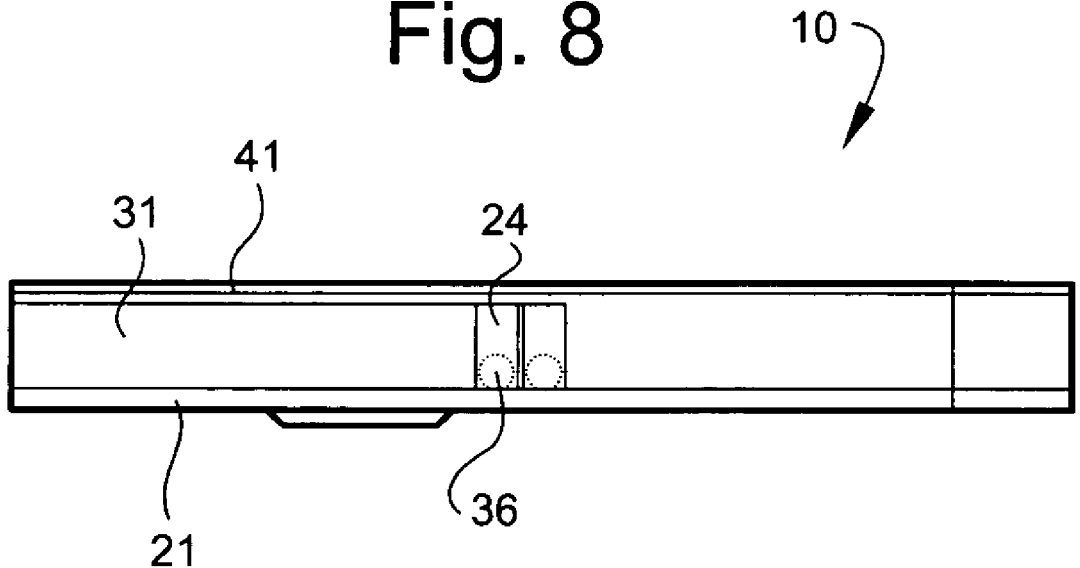
FIG. 8 is a cut-away view of the device according to the present invention clearly illustrating placement of the movable pieces in the event detection structures.

Either simultaneously, or before or after the event detecting and reporting circuitry 50 is surface mounted to the bottom board locations, the reseparated top/middle composite assemblies are turned over and replaced in a pin registered frame, thereby exposing the electrical component cavity 14. For each top/middle board location in the top/middle composite assembly, batteries are placed into the component cavity 14 and tilt/motion sensing pieces 36 are placed into their appropriate positions in the at least one aperture 34. Block 240, FIG. 6, see also FIGS. 7 and 8.

After these components are appropriately placed, the exposed surface of the top/middle panel assembly is stenciled with two-component epoxy at each top/middle board location and a bottom panel 121 with surface mounted circuitry 50 is mated to the top/middle composite assembly using the pin register frame thereby creating a top/middle/bottom composite assembly. Multiple top/middle/bottom composite assemblies are then stacked together and placed into a press for epoxy curing. Block 250, FIG. 6.

After curing, the top/middle/bottom composite assemblies are reseparated and the electrical through connections 32 are soldered together, thereby creating an electrical connection between the top, middle and bottom board locations. Block 260, FIG. 6. In an alternative embodiment, spring contact components are used instead of soldering for electrical connection between the top, middle, and bottom boards, 41, 31, and 21, respectively.

Next, a double backed adhesive sheet, stenciled epoxy, stenciled adhesive, or other adhesive is used to adhere a polyester overlay to both top and bottom surfaces of the top/middle/bottom composite assemblies. Preferably, a pin registered frame is used. The polyester overlay for the bottom surface may include, in an alternate embodiment, a conductive button portion for shorting (activating) a switch circuit, such as previously described and illustrated above. Block 270, FIG. 6.

A final route on the top/middle/bottom board assemblies is performed routing everywhere except for where the notches are located in the middle and bottom board locations, thereby creating one or more devices 10 that are attached to the panel matrix via at least one small tab connecting the top boards 41 sections to the top panel matrices. Block 280, FIG. 6.

An attachment structure 17, such a bottle mounting hole can be routed into the second composite assembly at this time and any exposed interior surface may be painted to match the exterior (rubber or plastic inserts may be used instead of paint). Block 290, FIG. 6. Preferably, the attachment structure is routed during the final route of Block 280.

Each individual device 10 in the array may be tested by flipping the top/middle/bottom composite assembly quickly several times. Block 300, FIG. 6. A receiver receives and records signals for each of the devices 10 in the array. This verifies operation of the circuitry and more specifically the transmitter signal strength and verifies tilt sensor 35 accuracy. Preferably, this may be performed on several stacked top/middle/bottom composite assemblies simultaneously. Additional vibration and or heat/cold cycle testing can be performed at this time. The test date may optionally be recorded on each panel prior to separation of the tags from the array.

Programming of the device 10 according to the present invention includes several critical functions, as described below. First, the device 10 must accurately be able to detect each transient event, such as a pour of a bottle, and the elapsed time of each event. Second, the device 10 must relay pour information and any other predetermined information reliably, accurately, and timely to one or more receivers with minimum user hassle, overhead, and expense. Third, preferably, there is a button that can be used to indicate when an associated asset is empty. This button can also be used during setup to assign the device 10 to a specific asset, a receiver, or host software. Alternately, the button can be used to transmit an information request to a receiver or host software.

The preferred embodiment of the device 10 is designed with a three year functional lifetime for practical and reliability reasons. To support the limited functional lifetime, the device 10 preferably comprises an internal 32-Bit Life Timer that starts at zero and increments when the device 10 is in an unused or untilted position. This allows users to store currently unused devices 10 in a used/tilted position until they are needed. After the 32-Bit Life Timer counts little more than three years, software in the device 10 will disable functionality of the device 10. Other time durations may be used and still considered to fall within the scope of the present invention.

In the preferred embodiment, the device 10 has at least two discrete event detection sensors, preferably a tilt sensor and a button. To minimize the latency of data transmission to the host, when collecting event data the device 10 transmits the event detection data immediately after detection. In the case of a button press, this means as soon the button is pressed without waiting for it to be released. For a tilt event, it is after the device 10 is tilted and then untilted. Preferably, event data for a tilt event includes the length of the tilt. In alternative embodiments, only one event detection sensor may be used. Other event detection sensors may be used, such as motion, temperature, acceleration, breakage (of the asset or the device 10), and the like. All such options are considered to fall within the scope of the present invention.

This immediate data transmission is called an Immediate Mode Transmission. It includes the immediate event data as well as a multitude of other data, which may include but is not limited to, a unique preferably 32-bit tag identification number (ID), multiple (preferably 15) previous events, a current event number, a life timer value (to determine the age of the device 10), and a cyclic redundancy check ("CRC").

When the device 10 is located within a realistic range from a receiver, typically about 50 feet, then a large majority (95% or more) of Immediate Mode Transmissions will be successfully received by the receiver. Reasons for unsuccessful reception include, but are not limited to, transmission collisions with another simultaneous transmission or spurious interference from other unrelated radio energy sources. In order to prevent the loss of data, the device 10 program comprises an event buffer that stores a number of the most recent, preferably 16, events. Therefore, each Immediate Mode Transmission not only contains the most recent events but also the previous 15.

Because there may be long time durations between detected events, if only Immediate Mode Transmissions were sent, then there could be an indefinite latency in transferring data if an Immediate Mode Transmission was not successfully received. Therefore, there are Beacon Mode Transmissions that are periodically transmitted, whether there are new events or not. There are two types of Beacon Mode Transmission, slow and fast, with the only difference being the frequency of transmission. Preferably, device 10 will always transmit a Slow Beacon Transmission for a first fixed duration, preferably every five minutes, when untilted. However, after an event occurs (and an Immediate Mode Transmission Occurs) the device 10 switches to Fast Beacon Mode. The device 10 then sends a Fast Beacon Transmission for a second, short duration, preferably every ten seconds, for a third intermediate duration, preferably for one minute, and then switches back to Slow Beacon Mode. This decreases any latency of any new event data being collected by the system. It also allows more accurate "time-stamping" of the detected event. Lastly, it dramatically decreases the likelihood of losing event data. Other durations may be used and still considered to fall within the scope of the present invention.

Beacon Mode Transmissions provide another function in addition to handling data latency problems. It also prevents data loss from occurring when devices 10 are moved temporarily out of the range of the receiver. For example, in a single receiver system, the device 10 may be temporarily moved out of receiver range to pour a drink. Because the event is stored in the memory of the device 10, when the device 10 is brought back in range, the receiver will collect the new data during the next successful Beacon Mode Transmission. Thus, no data will be lost as long as less than 16 events occur before a successful Beacon Mode Transmission. This allows an asset to be used or stored out of range as long as it is periodically moved into receiver range.

In order to facilitate the event buffer mechanism, the device 10 also maintains a (preferably 24-bit) Event Number that starts out at 0 when the device 10 is first manufactured. Each time there is a new event, this Event Number is incremented. In each transmission, Immediate and Beacon, not only are the data for the 16 stored events included in the transmission but also the entire 24-bit Event Number. This serves several purposes. First, since the 16 event buffer is continually reused in a circular fashion, the lower 4 bits of the Event Number will always be pointing to the oldest event entry in the event buffer. For instance, before any events have occured, when the device 10 is first manufactured, the Event Number will be 0 meaning there were no events, ever, for this device 10. After a first event, the event data will be stored in roll-over buffer location 0 and the Event Number will be incremented to 1. After the $16^{th}$ new event the new data will be stored in the $16^{th}$ location and the Event Number will be 16. The $17^{th}$ new event is then stored in location 0 and the Event Number will be 17.

Based on the Event Number, the receiver can determine how many new events are contained in the device 10. This is accomplished because the very first time a receiver receives a transmission from particular device 10; it records all 16 stored events and then stores the current Event Number for that device 10. Subsequently, every time a transmission is successfully received by the receiver from that device 10, the receiver or host software compares the Event Number in the transmission to the stored Event Number for that device. If the Event Number does not change, then there were no new events. If, for example, the Event Number increases by three, then receiver records the three new events.

The Event Number is also stored with the data for that event in the host software. This facilitates multi-receiver systems because in many cases more than one receiver may store the same events from the same devices 10. However, the host software can determine duplicates because it also keeps track of the Event Numbers. For example, if device #123 has a current Event Number of 55, and is in range of two receivers, then both receivers will have stored that the last event for device #123 was 55. If the device #123 is then tilted, the Event Number will increment to 56. If both receivers successfully received a transmission from device #123, then they will both store the new event data and both update the current Event Number for device #123 to 56. When the host software collects data from the first receiver, it will verify and determine that it does not have Event Number 56 from device #123 yet. However, when it collects the data from the second receiver, it will know it already has that event data and not save the duplicate.

The Event Number also allows the system to detect if more than 16 events have occurred since a successful transmission reception from the device 10. For example, if a device 10 is taken out of realistic range of any receiver and 19 events occur and then it is brought back into range of at least one receiver, that receiver will detect that there are 19 new events but knows that only the latest 16 are in the transmission and will only store those data. After the host software collects the data from all receivers it will detect that there are 3 missing events for that device 10. It can then generate a warning on any reports where this would be relevant.

The receiver stamps and records the time each transmission is received. In addition, the receiver stamps and records a value for each event that represents the time the event occurred or may have occurred ("Possible Age"). The Immediate Mode, Slow Beacon, and Fast Beacon Transmission all are exactly the same except for an identifier at the beginning that tells the receiver which type of transmission is being received. The main reason for this is to allow the receiver to time stamp the events more accurately. In order to conserve memory in the device 10, the preferred device 10 does not keep track of the chronological time an event occurs but only the order. Because an Immediate Mode Transmission is sent right after the event and it has a field indicating to the receiver it is an Immediate Mode Transmission, the receiver time stamps the new event with a Possible Age equal to the time the transmission was received. In rare cases, the Immediate Mode Transmission may not be successfully received. If that occurs, then if the next Beacon Mode Transmission a receiver receives is a Fast Beacon Transmission, the receiver knows the latest event happened less than one minute ago. The receiver still time stamps the data with the current time but also stores a value called Possible Age indicating the event happened up to a minute before. The receiver also checks if it had heard from the device 10 less than a minute ago and sets the Possible Age to whichever is less. If an Immediate Mode Transmission is not received and the next received transmission is a Slow Beacon Transmission, then the Possible Age for the new event is set to the length of time since the device 10 was last heard from by that receiver. If there is more than one new event, then all the events before the newest event get time stamped with the current time and the Possible Age of the length of time since the device 10 was last heard from by that receiver. The additional transmission of the chronological time of the event is an option that is considered to fall within the scope of the present invention. In addition, the calculation and storage of system data can be performed in devices 10, receivers, host software, or a combination thereof, and all such options are considered to fall within the scope of the present invention.

The current device 10 has a 16 Event Buffer, each one byte in length. This means all events must be encoded in one byte (a number between 0 and 255). Preferably, the current device 10 stores a Button Press Event as the value 255. Event times are stored with a resolution of $\frac{1}{16}^{th}$ seconds. This means the largest duration of an event could be is 254/16ths or 15.875 seconds. To support times longer than this, the value 254 is also reserved to indicate that the time is 253/16ths or greater. The remainder of 16ths is stored in the next event. Unless this is also larger than 253/16ths. Preferably, events of up to 127 seconds are cascaded in this manner. The Event Number is incremented for each entry even though it is part of the same event. The host software combines these cascaded events into one record in the software database. In the preferred embodiment, if the time is 127 or larger only a total of 127 is stored. The host software considers this a special case that is stored as 127 or more and it would be an exception noted to the user on any relevant reports. Different numbers may be used and would be considered to fall within the scope of the present invention.

The system can determine when a device 10 stops being heard from. To allow for this, a receiver stores the last time it heard a transmission from a device 10 even if no new event is transmitted. If no receiver hears from a device 10 for a length of time that may be predefined or set by a user, preferably 15 minutes, then the host software can generate a warning that the device 10 is missing. The system can inform the user of the last time the device 10 was received. If a device 10 is heard from again, the system can indicate the time the device 10 was found. This is important because it allows a user to have confidence that all assets are where they should be, that all devices 10 are functioning, and that all data has been collected (at least all data that occurred in the last 15 minutes or other configured warning time).

Since it is important for the device 10 to last as long as possible with as small as possible of battery, many design features are used to minimize power consumption. One power reduction method is that the device 10 hardware and software are designed so that, in general, the device 10 is always "sleeping" or in a powered down mode that minimized power consumption. However, the device 10 has a "wake timer mechanism" that "wakes" the device 10 after a predetermined duration. Preferably, this is about $\frac{1}{27}^{th}$ of a second. If no event occurs, the device 10 wakes about each $\frac{1}{27}^{th}$ of a second and if untilted just updates the Life Timer with the time it was sleeping. If the device 10 is currently tilted then it increments the Tilt Timer by how long it was sleeping.

To facilitate lower cost, lower power usage, and smaller size, the preferred wakeup mechanism is a simple RC (resistor-capacitor) timer or RC oscillator. By itself, the RC timer is not very accurate and would be slightly different between different devices 10 and would also vary for the same device 10 based on temperature.

Because the device 10 needs to keep the life timer and determine tilt times as accurately as possible, it uses a unique method to determine the current time constant of the RC timer. It does this by periodically comparing it to an accurate crystal oscillator. Preferably, the current device 10 does this once per hour and whenever an event is detected (in order to calculate event times as accurate as possible in the cases where temperature may have changed in the last hour). This method does not increase the cost, size, or component count of the device 10 because it already has a crystal oscillator to support the radio transmitting function. The crystal oscillator takes more power than the RC timer but it only takes a few thousandths of seconds to do the comparison (and preferably only once per hour), so the overall power consumption is only minutely more than the RC timer. A potentially useful function of this RC timer/crystal method is the device 10 also can measure temperature variations.

While stored, the device 10 can be turned over to a tilted state. While in this tilted state, the device 10 does not transmit Beacon Transmissions. In addition, after 127 seconds in a tilted state, the device 10 switches the RC timer to wake it up less often to have even lower power consumption, preferably every 2 seconds.

Preferably, when the device 10 wakes up, it supplies voltage to the tilt sensor contact configurations, 23 and 44, on the top and bottom boards to determine whether a sensor is shorted. This is used to determine static tilt. However, no static short may exist while the device 10 is temporarily awake. Therefore, the device 10 also determines dynamic tilt by having a short to a sensor wake it up. Preferably, this is accomplished by having each sensor connected to the In-Out pins of the microcontroller on the device 10. The device 10 software only enables the contact configuration on the opposite side to wake it. In other words, if currently untilted, then the device 10 only enables the contact configuration on currently the "top" (tilted) side to wake it up. If the device 10 is flipped over, then a dynamic short will wake it up. The device 10 knows if it was woken up by the pin change feature so even if no static short is detected it knows it must now be tilted. It then reverses the contact configuration so that the one on the bottom (untilted) side will be the active one. This saves power because the inactive contact configuration will have no voltage applied to it so no power is wasted in the case that there is a static short.

The current device 10 transmission protocol for Immediate/Slow Beacon/Fast Beacon Transmissions is formatted as follows:

48 bit synchronization (sync) sequence composed of "11110000 11110000 11110000 11110000 11110000 11100010";

6-bit packet type (preferably 0);

2-bit transmission type (preferably, 00 means immediate, 01 means slow beacon, and 10 means fast beacon);

32-bit device 10 ID number;

8-bit life timer (only the most significant 8 bits of the 32-bit internal value);

8-bit timer calibration value (this may be converted to temperature by the host software because it will vary linearly with temperature);

24-bit Event Number;

Sixteen 8-bit event buffer entries;

16-bit CRC in the CCITT-16 convention (used to make sure the transmission was received correctly by the receiver); and 4-bit sequence of "0011" used to be able to determine signal strength by the receiver. It does this by taking a signal strength sample during the 0's and then during the 1's and comparing the difference.

Of course, different bit lengths, different amounts, different numbers, and different sequences may be used and all such options are considered to fall within the scope of the invention.

Preferably, with the exception of the initial 48-bit sync sequence and the last 4-bit sequence, all actual data is Manchester Encoded. This means that each data bit is actually converted to a 2 bit Manchester sequence of "01" or "10". A data bit of "0" is converted to a two bit "raw" sequence of "01" and a data bit of "1" is converted to a two bit "raw" sequence of "10". This is for many reasons. First the preferred transmission method for the device 10 is On-Off-Keying (OOK). This means that radio frequency energy is being generated to transmit a "1" and no radio frequency energy is being sent to transmit a "0". Because, from the receiver's point of view there is always background radio noise even when no device 10 in range is transmitting, the receiver "averages" the current radio frequency energy received in the last $1/100^{th}$ of a second or so and then compares the instantaneous received RF energy to this average. If it is greater, than it assumes a raw bit "1" and, if lower, it assumes a raw bit "0".

Preferably, all device 10 transmissions contain an equal number of "raw" 0's versus "raw" 1's. Converting each data bit to a "raw" two bit balanced sequence ("01" and "10") accomplishes this. This is also the reason the transmission starts with the 48 bit balanced (equal number of "raw" 0's and 1's) sync sequence. This gives the averaging mechanism in the receiver time to stabilize. Additionally, the sync sequence used by the system will ensure that the receiver will not mistake the sync sequence for valid data.

If a proper sync sequence is received, the use of Manchester Encoding helps the receiver determine whether a transmission is being successfully received. This is because the only valid "raw" sequence after the synchronization sequence will be "01" or "10" for each actual data bit. Therefore, the receiver knows there is a reception error if "00" or "11" occurs in any "raw" two bit sequence following the sync sequence, and it abandons the decoding. If all the data bits (each two bit raw sequence) are received, the transmission is further validated by the receiver using the 16-bit CRC value.

Other methods of transmission and encoding may be used and are considered to fall under the scope of the present invention.

Because, in the preferred embodiment, devices 10 transmit for a very short time period (typically $1/100$ths of a second) and only every five minutes or when an event occurs, collisions between two device 10 transmissions will be rare. If a collision does occur between two transmissions, it would be expected that the system would not decode either transmission. However, the present invention is designed to more likely receive a transmission from closer devices 10 in the event of a collision. For example, in one potential application, a user may have multiple bar areas each with multiple devices 10 attached to bottles and at least one receiver in each bar area. Depending on how close the bar areas are to each other, a transmission from a device 10 may be picked up by a receiver not only in that bar area but also in other bar areas. If a device 10 is transmitting and a receiver starts to hear a transmission from another device 10 that is further away, depending on the strength of the signal (or energy of the transmission) of the two devices 10, the receiver will continue to decode the proximate device 10 and ignore the distal device 10. Conversely, if a distal device 10 is picked up by a receiver and a proximate device 10 starts to transmit, the distal device's 10 transmission will be abandoned in favor of the proximate 10 device. The sync sequence used guarantees that an invalid data bit sequence will occur during the reception of the distant device when the proximate device 10 starts to transmit. The receiver can then stop decoding the transmission from the distal device 10 and instead decode the transmission from the proximate device 10. Advantageously, the protocol used by the system allows a user to have more devices 10 in an area by adding additional receivers in the area.

In implementing this functionality and protocol, software with specific functionality is programmed into the circuitry 50 of the present invention.

Figure 9:
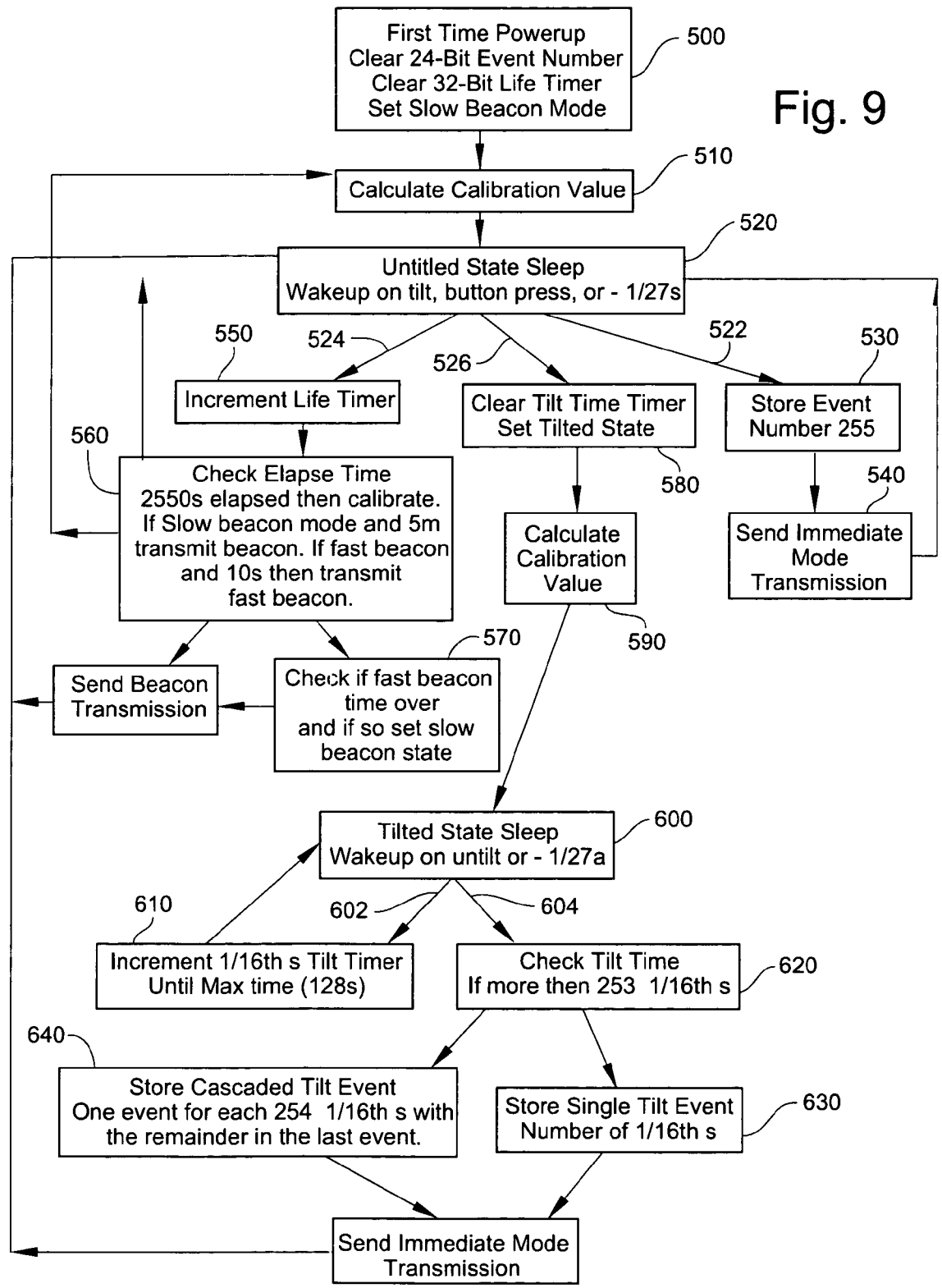
FIG. 9 is a flow chart of the functionality of the software for the device according to the present invention.

More specifically with reference to FIG. 9, the preferred software begins upon first powerup, Block 500, which clears a 24-bit event number, clears a 32-bit Life Timer, sets the slow beacon mode in effect, and sets the untilted configuration or mode.

A calibration value is calculated, Block 510. Then the device 10 goes into untilted sleep state, but will wakeup upon a tilt event, a button press, or after $1/27$ths of a second. Block 520.

Upon a button press, event 522, the event is stored in the first available memory location. Block 530. After the event is stored, an Immediate Mode Transmission is triggered, thereby transmitting event data to a receiver Block 540 and the device returns back to untilted sleep state Block 520.

Upon $1/27^{th}$ of a second time duration, event 524, the Life Timer is incremented Block 550. The elapsed time is checked Block 560. If the elapsed time is 2560 or more seconds, then return to recalculate the calibration value Block 510. If the Slow Beacon Mode is in effect and 5 minutes have elapsed, then trigger a Slow Beacon Transmission and return to the sleep state Block 520. If the Fast Beacon Mode is in effect and 10 seconds have elapsed, then check to see if Fast Beacon Mode should be changed to Slow Beacon Mode (and, if so, unflag Fast Beacon Mode and flag Slow Beacon Mode) Block 570, trigger a Fast Beacon Transmission, and then return to the sleep state Block 520.

Upon a tilt, event 526, clear the tilt time timer and set the state to tilted Block 580; calculate a calibration value Block 590; and enter a tilted sleep state Block 600. After $1/27$ths of a second has elapsed, event 602, increment the tilt timer by $1/16$ths of a second, until the maximum time of 127 seconds has been reached, Block 610 and return to the tilted sleep state Block 600.

After the device 10 has been untilted, event 604, the tilt time is checked Block 620. If the time is less than 253 $1/16$ths of a second, then store the number of $1/16$ths of a second for the event duration Block 630 and trigger an Immediate Mode Transmission. If the time is more than 253 $1/16$ths of a second, store a cascaded event Block 640 (one event for each 254 $1/16$ths seconds with the remainder in the last event) and trigger an Immediate Mode Transmission. After triggering the Immediate Mode Transmission, return to the sleep state Block 510.

This flow is followed until the Life Timer is exceeded, the battery runs down, or the circuitry 50 is broken or destroyed.

The preferred embodiment of the invention is described above in the Detailed Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

The invention claimed is:

1. An event detector comprising:
    a first circuit board having a top surface on which a first contact configuration resides, said first contact configuration having radially-extending arms electrically coupled together;
    a second circuit board overlying said top surface of said first circuit board, said second circuit board having an aperture overlying said first contact configuration and having conductive plating on an inside surface of said aperture;
    a third circuit board having a bottom surface on which a second contact configuration resides, said third circuit board overlying said second circuit board so that said second contact configuration is at said aperture; and
    a conductive movable piece positioned within said aperture and configured to move within said aperture to short said first contact configuration to said conductive plating when resting on said first circuit board and in contact with said conductive plating.

2. An event detector as claimed in claim 1 wherein said second contact configuration has radially-extending arms electrically coupled together.

3. An event detector as claimed in claim 1 wherein said conductive moveable piece is in the shape of a sphere.

4. An event detector as claimed in claim 1 additionally comprising a battery substantially aligned with said second circuit board relative to at least one of said first and third circuit boards.

5. An event detector as claimed in claim 4 wherein said first, second, and third circuit boards have electrical through connections to supply electrical connectivity between a surface of one of said first and third circuit boards and opposing sides of said battery.

6. An event detector as claimed in claim 1 wherein:
    said aperture in said second circuit board is a first aperture and said conductive movable piece is a first conductive movable piece;
    a fourth contact configuration resides on said top surface of said first circuit board;
    a fifth contact configuration resides on said bottom surface of said third circuit board;
    said second circuit board has a second aperture overlying said fourth contact configuration and underlying said fifth contact configuration, with conductive plating on an inside surface of said second aperture; and
    said event detector additionally comprises a second conductive movable piece positioned within said second aperture.

7. An event detector as claimed in claim 6 wherein at least one of said first and second apertures is beveled.

8. An event detector as claimed in claim 1 additionally comprising a microprocessor supported on one of said first and third circuit boards, coupled to said first and second contact configurations and to said conductive plating, and configured to cause said event detector to operate as a tilt detector.

9. An event detector as claimed in claim 8 wherein:
said event detector additionally comprises an antenna formed on one of said first and third circuit boards and electrically coupled to said microprocessor; and
said microprocessor is configured in cooperation with said antenna to report tilt events using radio frequency transmissions.

10. An event detector as claimed in claim 8 wherein said microprocessor is configured to measure elapsed time in a tilted orientation.

11. An event detector as claimed in claim 1 wherein said second circuit board is thicker than said first circuit board and said second circuit board.

12. An event detector as claimed in claim 1 wherein each of said first, second, and third circuit boards has conductive traces formed thereon.

13. An event detector as claimed in claim 1 wherein said second circuit board is in physical contact with said first and said third circuit boards.

14. An event detector comprising:
a first circuit board having a top surface on which a first contact configuration resides;
a second circuit board overlying said top surface of said first circuit board, said second circuit board having an aperture overlying said first contact configuration and having conductive plating on an inside surface of said aperture;
a third circuit board having a bottom surface on which a second contact configuration resides, said third circuit board overlying said second circuit board so that said second contact configuration is at said aperture; and
a conductive movable piece positioned within said aperture and configured to move within said aperture to short said first contact configuration to said conductive plating when resting on said first circuit board and in contact with said conductive plating; and a battery substantially aligned with said second circuit board relative to at least one of said first and third circuit boards.

15. An event detector as claimed in claim 14 wherein said first, second, and third circuit boards have electrical through connections to supply electrical connectivity between a surface of one of said first and third circuit boards and opposing sides of said battery.

16. An event detector as claimed in claim 14 wherein:
said aperture in said second circuit board is a first aperture and said conductive movable piece is a first conductive movable piece;
a fourth contact configuration resides on said top surface of said first circuit board;
a fifth contact configuration resides on said bottom surface of said third circuit board;
said second circuit board has a second aperture overlying said fourth contact configuration and underlying said fifth contact configuration, with conductive plating on an inside surface of said second aperture; and
said event detector additionally comprises a second conductive movable piece positioned within said second aperture.

17. An event detector as claimed in claim 14 additionally comprising a microprocessor supported on one of said first and third circuit boards, coupled to said first and second contact configurations, to said conductive plating, and to said battery, and configured to cause said event detector to operate as a tilt detector.

18. An event detector as claimed in claim 17 wherein:
said event detector additionally comprises an antenna formed on one of said first and third circuit boards and electrically coupled to said microprocessor; and
said microprocessor is configured in cooperation with said antenna to report tilt events using radio frequency transmissions.

19. An event detector as claimed in claim 17 wherein said microprocessor is configured to measure elapsed time in a tilted orientation.

20. An event detector as claimed in claim 14 wherein said second circuit board is thicker than said first circuit board and said second circuit board.

* * * * *